United States Patent [19]

Hilmar

[11] 4,257,536
[45] Mar. 24, 1981

[54] LAMINATE STRUCTURE FOR COLLAPSIBLE DISPENSING CONTAINER

[75] Inventor: Shaun K. Hilmar, Menasha, Wis.

[73] Assignee: American Can Company, Greenwich, Conn.

[21] Appl. No.: 84,663

[22] Filed: Oct. 15, 1979

[51] Int. Cl.³ .................... B65D 35/08; B32B 15/08; B32B 27/08

[52] U.S. Cl. .................................... 222/107; 428/35; 428/36; 428/458; 428/461; 428/480; 428/483; 428/516

[58] Field of Search .................. 222/107; 428/35, 36, 428/458, 461, 423.7, 424.4, 424.8, 425.8, 516, 480, 483

[56] References Cited

U.S. PATENT DOCUMENTS

| | | | |
|---|---|---|---|
| 3,170,833 | 2/1965 | Noyes | 428/425.8 |
| 3,172,571 | 3/1965 | Marchak | 222/107 |
| 3,260,410 | 7/1966 | Brandt et al. | 222/107 |
| 3,295,725 | 1/1967 | Brandt | 222/107 |
| 3,347,419 | 10/1967 | Brandt et al. | 222/107 |
| 3,441,057 | 4/1969 | Clement et al. | 222/107 |
| 3,505,143 | 4/1970 | Haas et al. | 222/107 |
| 3,740,306 | 6/1973 | Kosbab et al. | 428/461 |
| 3,899,621 | 8/1975 | Willdorf | 428/423.7 |
| 4,092,452 | 5/1978 | Hori et al. | 428/516 |
| 4,142,630 | 3/1979 | Hayes et al. | 222/107 |

Primary Examiner—William R. Dixon, Jr.

Attorney, Agent, or Firm—Robert P. Auber; Stuart S. Bowie

[57] ABSTRACT

A collapsible dispensing container for packaging preparations containing hard-to-hold ingredients such as acetic acid. The container comprises a deformable tubular body and a thermoplastic head fused thereto. The wall of the tubular body is made of a plurality of laminations, including a sealant core film which prevents product migration and delamination. The wall of the tubular body comprises, from the inside of the tubular body toward the outside thereof, overlying layers of ethylene-acrylic acid copolymer, the sealant core film and an outer thermoplastic (e.g., polyethylene) layer bonded to the outer layer of the sealant core film by another layer of ethylene-acrylic acid copolymer. The sealant core film comprises a metallic foil (e.g., aluminum) layer bonded to said inner ethylene-acrylic acid layer, an intermediate biaxially oriented corona treated polyester barrier layer bonded to said metal foil layer by a polyester adhesive layer or other suitable adhesive and an outer layer of ethylene-vinyl acetate or narrow molecular weight distribution (MWD) polyethylene bonded to the outer surface of said barrier layer by another polyester adhesive layer or other suitable adhesive. All layers are coextensively bonded to each other along their entire respective surfaces to insure against product migration and delamination at the metal foil interface.

24 Claims, 3 Drawing Figures

LAMINATE STRUCTURE FOR COLLAPSIBLE DISPENSING CONTAINER

FIELD OF INVENTION

The present invention relates generally to containers, and is particularly related to collapsible dispensing containers having a tubular body with laminated wall structure characterized by improved environmental stress crack resistance, improved impact strength and resistance to delamination and imperviousness to certain hard-to-hold ingredients, such as, for example, acetic acid found in silicone caulking compounds and in other preparations.

This invention is also concerned with an improved laminated sheet for use in making tubular bodies of such collapsible dispensing containers.

BACKGROUND OF INVENTION

Collapsible dispensing containers have been widely used for packaging various preparations. Metallic tubes were used in the past for packaging pharmaceutical products, cosmetics, toiletries and other preparations which contain volatile ingredients since metals are impervious to oxygen, moisture and such volatile ingredients. However, metal tubes are costly to produce due to high costs of the metals (usually aluminum or lead) used in making the tubes, and the manner in which the tubes must be made.

Plastic tubes have also been widely used in the past for packaging cosmetics and personal preparations such as shampoos, etc. While plastic tubes are less costly to produce than metal tubes, and they are generally relatively inert to most chemicals, they are usually a poor barrier to moisture, oxygen and volatile ingredients such as essential oils, perfumes, mustard, dentifrices, medicinal ointments, shaving creams, etc.

Attempts have heretofore been made to extend the use of plastic tubes for packaging preparations which contain volatile ingredients by using a laminate structure which comprises a barrier layer of a metal foil (e.g., aluminum) laminated to a plastic (e.g., polyethylene). Tubes having such laminated wall construction combine the desirable properties of both plastics and metals and have found widespread commercial acceptance. One example of such tube is described in U.S. Pat. No. 3,260,410, issued to Roger Brandt and Ralph Kaercher on July 12, 1966 which is owned by the assignee of this present application. The laminated structure used in making the tubular body of the collapsible dispensing container described in the aforementioned patent comprises a metal foil barrier layer and a layer of a copolymer of olefin (e.g., ethylene) and a polar group-containing monomer (e.g., acrylic acid), with the preferred copolymer being ethylene-acrylic acid copolymer.

A further advance in the collapsible dispensing container art is represented by U.S. Pat. No. 3,347,419 issued to Roger Brandt and Nicholas Mestanas on Oct. 17, 1967 which is also assigned to the assignee of the present application. The tubular body of the collapsible tube described in the latter patent is made of a laminated sheet comprising an intermediate metal foil layer (e.g., aluminum) and an inner layer of a thermoplastic polymer (e.g., polyethylene) which is adhesively bonded to the foil layer by means of a copolymer of olefin (e.g., ethylene) and a polar group-containing monomer (e.g., acrylic acid). Again, and as in the aforementioned U.S. Pat. No. 3,264,410, a copolymer of olefin and acrylic acid constitutes the preferred adhesive copolymer. The thermoplastic inner layer affords improved bonding between the tubular body and the headpiece of the container, which itself is usually made of polyethylene.

Other patents of interest in the collapsible dispensing container art, and the laminate structures used in their construction, are represented by U.S. Pat. Nos. 3,172,571 issued on Mar. 9, 1965 to Nicholas Marchak; 3,295,725, issued on Jan. 3, 1967 to Roger Brandt, and 3,505,143, issued to David Haas and Kurt Roesch on Apr. 7, 1970, all of which are also assigned to the assignee of the present application.

While the laminated structures heretofore employed in making the tubular bodies of collapsible dispensing containers effectively prevent product migration through the tube and are excellent against attacks by oxygen, moisture, essential oils and other volatile components of the contained products, they have not shown the requisite resistance to attacks by certain other hard-to-hold ingredients of various preparations. Thus, when preparations which contain acetic acid are packaged in such containers, the acetic acid migrates toward the foil interface and causes delamination of the foil.

It is accordingly an object of this invention to provide a collapsible dispensing container which is uniquely suitable for packaging such hard-to-hold products.

It is also an object of this invention to provide an improved laminated structure for making the tubular bodies of such collapsible dispensing containers.

It is a further object of this invention to provide a laminate structure characterized by improved stress crack resistance, improved impact strength, improved resistance to delamination and imperviousness to acetic acid and preparations which contain acetic acid.

The foregoing and other advantages of this invention will become more apparent from the following detailed description of its preferred embodiment and the accompanying drawings.

SUMMARY OF INVENTION

In accordance with this invention, a unique multiply laminate is used to form the tubular body of a collapsible dispensing container designed to package certain hard-to-hold preparations containing acetic acid, such as, for example, silicone caulking compounds.

The laminated tubular body of the container comprises, from the inside of the container to its outside, overlying layers of ethylene-acrylic acid copolymer, a sealant core film and an outer thermoplastic (e.g., polyethylene) layer bonded to the outer layer of the sealant core film by another layer of ethylene-acrylic acid copolymer.

The sealant core film comprises a metallic (e.g., aluminum) layer bonded to said inner ethylene-acrylic acid layer, an intermediate, biaxially oriented polyester barrier layer bonded to said metal foil by a polyester adhesive layer, and an outer ethylene-vinyl acetate layer bonded to the outer surface of said barrier layer by another polyester adhesive layer.

One surface of the polyester barrier layer is pretreated with corona discharge to enhance adhesion thereto.

BRIEF DESCRIPTION OF THE DRAWINGS

Referring to the drawings, wherein like reference numerals are used to designate like parts.

DESCRIPTION OF THE PREFERRED EMBODIMENT OF THE INVENTION

Figure 1:
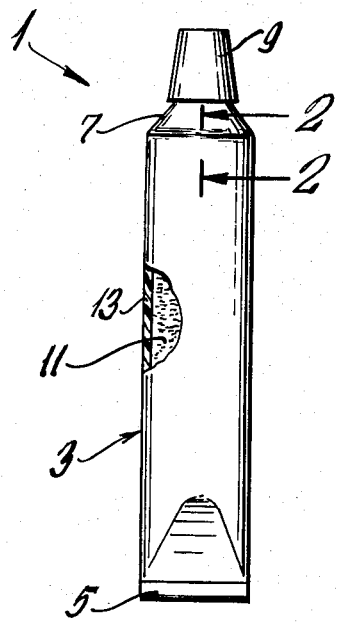
FIG. 1 is a side elevation view of a collapsible tube having a laminated wall structure made in accordance with this invention.

Referring to FIG. 1 of the drawings, there is shown a collapsible dispensing tube generally designated as 1, having a tubular wall 3 which is heat sealed at its lower end 5. At its upper end, the tubular wall 3 has a headpiece 7 which is usually externally threaded so that an internally threaded cap 9 may be secured thereto after the tube 1 is filled with product 11. The tubular wall 3 comprises a laminated sheet 13 which is usually rolled into tube form and joined in a side seam (not shown) at the edges of the laminated sheet.

Figure 2:
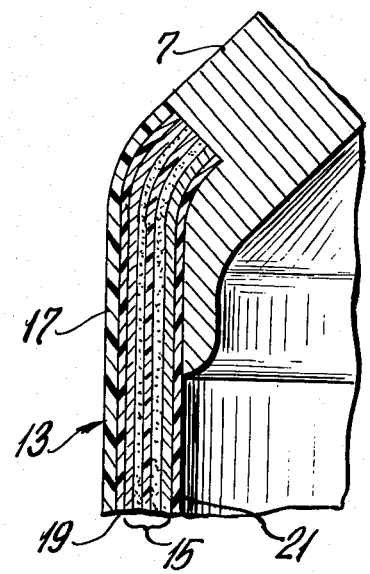
FIG. 2 is an enlarged section taken along the line 2—2 in FIG. 1 illustrating the component layers of the laminated wall structure of the collapsible tube.

The laminated sheet 13 of the tubular body comprises a plurality of layers laminated or otherwise bonded to each other to provide a laminated wall structure which is impervious to the hard-to-hold products, while exhibiting improved environmental stress crack, resistance to delamination and improved impact resistance required for high viscosity products such as silicone caulks. Thus, as illustrated in FIG. 2, the laminated sheet 13 of the tubular wall 3 comprises a laminated sealant core film 15 adhesively laminated to an outer thermoplastic polymer layer 17 such as a layer of medium density polyethylene (MDPE) by an intermediate layer 19 made of a copolymer of ethylene with acrylic acid. Interiorly, and on the product side, the laminated sheet 13 comprises an inner layer 21 of copolymer of ethylene-acrylic copolymer which is bonded to the sealant core 15 as will hereinafter be described. The inclusion of ethylene-acrylic acid copolymer layers 19 and 21 also serve the dual functions of imparting resistance to environmental stress cracking and providing the rough matte finish required in such tubes.

Optionally, the polyethylene layer 17 may be pigmented for opacity and color, and a layer of printed data may be applied thereon if desired. The provision of such layer, however, is not strictly necessary.

Figure 3:
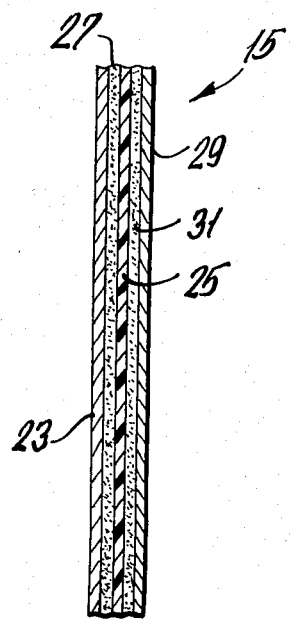
FIG. 3 is a fragmentary enlarged sectional view of the sealant core film showing the layers thereof.

The inclusion of the sealant core film 15 in the laminated sheet 13 of the tubular body 3 affords increased protection against delamination caused by the acetic acid ingredient of silicone caulking compounds and other acetic acid-containing products which are packaged in the dispensing tubes made in accordance with this invention. The sealant core film 15, as is best illustrated in FIG. 3, comprises a metal foil layer 23, which is typically an aluminum foil, and further includes a barrier layer 25 designed to prevent acetic acid migration toward the metal foil interface. Biaxially oriented poly(ethylene terephthalate) film, a polyester, constitutes the barrier layer of choice for the purpose of this invention. One surface of the polyester layer is treated with corona discharge to improve adhesion. The corona discharge treated polyester barrier layer 25 is adhesively bonded to the aluminum foil 23 through an adhesive layer 27 to be hereinafter defined.

The sealant core film 15 further includes an outer heat sealable layer 29 such as a layer of narrow molecular weight distribution polyethylene of the type manufactured by the Du Pont Company under the trademark "Sclair", or a layer of ethylene-vinyl acetate copolymer in which, preferably, the copolymerized vinyl acetate constitutes from about 3.5 to about 30 weight percent of the copolymer. The heat sealable layer 29 imparts additional environmental stress crack resistance to the tube wall.

Interiorly, the heat sealable layer 29 is adhesively bonded to the barrier layer 25 through an adhesive layer 31, and exteriorly, the barrier layer 25 is adhesively bonded to the foil layer 23 through an adhesive layer 27 as shown in FIG. 3.

The adhesive layers 27 and 31 are thermosetting adhesives such as, for example, a two component polyester-based adhesive resin typically used for flexible adhesive laminations to treated or untreated polyester film. Such polyester adhesive consists of a polyester-based resin with a toluene diisocyanate (TDI) catalyst which react to form a polyester based urethane adhesive. Other thermosetting adhesives include polyether urethane type adhesives and polyethyleneimine (PEI).

Thus, and as it is evident from the foregoing description, the laminated sheet 13 comprises a plurality of overlying bonded layer uniquely selected to provide the requisite protection against acetic acid and other hard-to-hold ingredients of certain packaged materials such as silicone caulking compounds.

The composite sheet 13 may be made of relatively small thickness while still retaining the structural integrity and the other aforementioned desired attributes of the tube wall.

In making the laminate sheet 13, the sealant core file 15 is first made by adhesively bonding the aluminum foil 23 to the barrier layer 25 using the first polyester adhesive layer 27. The barrier layer 25 is also bonded along the inner surface to the layer 29 of ethylene vinyl acetate copolymer or a narrow molecular weight distribution polyethylene, using the second polyester adhesive layer 31 similar to the polyester adhesive layer 27, or any other suitable adhesive.

The sealant core film 15 thus made is then extrusion laminated to the outer thermoplastic (MDPE) layer 17 through an intermediate ethylene-acrylic acid copolymer layer 19. Interiorly, and on the product side, the extrusion laminated sealant core 15 is coated with the overlying layer of ethylene-acrylic acid copolymer layer 21 to complete the laminate sheet 13 structure.

The aforementioned layers of the laminated sheet 13 are generally coextensive and are bonded to each other along their entire respective surfaces to insure against delamination and product migration to the foil interface.

Once the laminated sheet 13 is made, it may be formed into a tube for making the dispensible containers. The tubes may be formed using conventional methods and equipment as described, for example, in the aforementioned commonly assigned patent of Nicholas Marchak.

While the laminated structure of this invention has heretofore been described with a certain degree of particularity, several modifications may be made therein. For example, additional and decorative layers may be included in the composite layers without altering the basic properties of the laminated sheet 13 or the tubular bodies made therefrom. Such modifications, however, are obvious from the present disclosure, and therefor, they are within the scope and contemplation of this invention.

What is claimed is:

1. A collapsible dispensing container having a tubular body and a thermoplastic head fused thereto, said tubular body having a plurality of laminations, including a sealant core film, a first overlying layer of ethylene-acrylic acid copolymer on the product side of said sealant core film, an outer overlying thermoplastic polymer layer and a second layer of ethylene-acrylic acid copolymer for adhesively bonding the outer side of said sealant core film to said outer thermoplastic polymer layer; said sealant core film comprising a metallic foil layer secured to said second ethylene-acrylic acid copolymer layer, an intermediate polyester barrier layer bonded to said metal foil layer by a first adhesive layer and a heat sealable polymer layer bonded to the other surface of said barrier layer by a second adhesive layer.

2. A dispensing container as in claim 1 wherein said outer thermoplastic layer of the tubular body is polyethylene.

3. A dispensing container as in claim 1 wherein said metal foil is aluminum.

4. A dispensing container as in claim 3 wherein said heat sealable layer is ethylene-vinyl acetate copolymer.

5. A collapsible container as in claim 3 wherein said polyester barrier layer is biaxially oriented.

6. A dispensing container as in claim 2 wherein said metal foil is aluminum.

7. A dispensing container as in claim 6 wherein said heat sealable layer is ethylene-vinyl acetate copolymer.

8. A collapsible container as in claim 6 wherein said polyester barrier layer is biaxially oriented.

9. A dispensing container as in claim 2 wherein said heat sealable layer is ethylene-vinyl acetate copolymer.

10. A collapsible container as in claim 2 wherein said polyester barrier layer is biaxially oriented.

11. A dispensing container as in claim 1 wherein said heat sealable layer is ethylene-vinyl acetate copolymer.

12. A collapsible container as in claim 1 wherein said polyester barrier layer is biaxially oriented.

13. A multiply laminate for making tubular walls for collapsible dispensing containers, said laminate comprising a sealant core film, a first layer of ethylene-acrylic acid copolymer overlying the product side of said sealant core film, a second layer of ethylene-acrylic acid overlying the other side of said sealant core film and an outer layer of a thermoplastic polymer layer overlying said second ethylene-acrylic acid copolymer layer; said sealant core film comprising a metallic foil layer bonded to said second ethylene-acrylic acid layer, an intermediate polyester barrier layer bonded to said metal foil layer by a first adhesive layer, a heat sealable layer bonded by a second adhesive layer to the other side of said polyester barrier layer.

14. A multiply laminate as in claim 12 wherein said outer thermoplastic layer of the laminate is polyethylene.

15. A multiply laminate as in claim 14 wherein said metal foil is aluminum.

16. A multiply laminate as in claim 15 wherein said heat sealable layer is ethylene-vinyl acetate copolymer.

17. A multiply laminate as in claim 15 wherein said polyester barrier layer is biaxially oriented.

18. A multiply laminate as in claim 14 wherein said heat sealable layer is ethylene-vinyl acetate copolymer.

19. A multiply laminate as in claim 14 wherein said polyester barrier layer is biaxially oriented.

20. A multiply laminate as in claim 13 wherein said metal foil is aluminum.

21. A multiply laminate as in claim 20 wherein said heat sealable layer is ethylene-vinyl acetate copolymer.

22. A multiply laminate as in claim 20 wherein said polyester barrier layer is biaxially oriented.

23. A multiply laminate as in claim 13 wherein said heat sealable layer is ethylene-vinyl acetate copolymer.

24. A multiply laminate as in claim 13 wherein said polyester barrier layer is biaxially oriented.

* * * * *